(12) United States Patent
Blanchard

(10) Patent No.: US 7,274,412 B2
(45) Date of Patent: Sep. 25, 2007

(54) STEREOSCOPIC IMAGING ASSEMBLY EMPLOYING A FLAT PANEL DISPLAY

(75) Inventor: Randall D. Blanchard, San Diego, CA (US)

(73) Assignee: L3 Communications Corporation, San Diego, CA (US)

( * ) Notice: Subject to any disclaimer, the term of this patent is extended or adjusted under 35 U.S.C. 154(b) by 94 days.

(21) Appl. No.: 10/912,924

(22) Filed: Aug. 6, 2004

(65) Prior Publication Data
US 2005/0078369 A1    Apr. 14, 2005

Related U.S. Application Data

(60) Provisional application No. 60/509,812, filed on Oct. 8, 2003.

(51) Int. Cl.
*G02F 1/1335*    (2006.01)

(52) U.S. Cl. .................................................. 349/15
(58) Field of Classification Search ................ 349/15
See application file for complete search history.

(56) References Cited

U.S. PATENT DOCUMENTS

| | | | |
|---|---|---|---|
| 5,686,975 A | 11/1997 | Lipton | 349/15 |
| 6,049,428 A | 4/2000 | Khan et al. | 359/491 |
| 6,384,971 B1 | 5/2002 | Faris | 359/483 |
| 6,399,166 B1 | 6/2002 | Khan et al. | 428/1.31 |
| 6,593,959 B1 | 7/2003 | Kim et al. | 348/57 |
| 6,801,263 B2 * | 10/2004 | Sato et al. | 349/15 |

OTHER PUBLICATIONS

Faris, Sadeg M., Reveo, Inc., Hawthorne, NY, "Micro-Polarizer Arrays Applied to a New Class of Stereoscopic Imaging", SID 91 Digest, 1991, pp. 840-843.
Optiva promotional brochure, "revolutionizing technology through material science", 2003.

* cited by examiner

*Primary Examiner*—James A. Dudek

(57) ABSTRACT

A stereoscopic imaging assembly for converting true visual images of a real-life subject to a stereoscopic image includes a display and an analyzer. The display is preferably a liquid crystal display, which includes first image pixels, second image pixels, and a polarizer. The first image pixels are responsive to a first electronic image of a first true visual image and the second image pixels are responsive to a second electronic image of a second true visual image. The polarizer has a first polarization material, which enables transmission of light of a first polarity, while blocking light of a second polarity, thereby transmitting a first polarized image having a first polarity. A second polarization material enables transmission of light of the second polarity, while blocking light of the first polarity, thereby transmitting a second polarized image having a second polarity. The analyzer delivers the first polarized image to the first eye of an observer while excluding the second and delivers the second polarized image to the second eye while excluding the first, which enables the observer to synthesize the first and second polarized images into a stereoscopic visual image.

33 Claims, 5 Drawing Sheets

STEREOSCOPIC IMAGING ASSEMBLY EMPLOYING A FLAT PANEL DISPLAY

This is a non-provisional patent application claiming the benefit of my Provisional Patent Application No. 60/509,812, filed on Oct. 8, 2003, and entitled "Stereoscopic Imaging Assembly Employing a Flat Panel Display", which is incorporated herein by reference.

TECHNICAL FIELD

The present invention relates generally to stereoscopic imaging, and more particularly to a stereoscopic imaging assembly which includes a flat panel display and an associated analyzer.

BACKGROUND OF THE INVENTION

Many land-based military vehicles, particularly armored vehicles, such as tanks, personnel carriers, and the like, are provided with optical navigation systems, which enable the vehicle operator to visually navigate the vehicle while the operator resides in the interior of the vehicle in visual isolation from the surroundings of the vehicle. The operator navigates the vehicle by viewing a display for the optical navigation system, which provides the operator with a two-dimensional likeness of the three-dimensional real-life environment outside the vehicle. As such, the optical navigation system permits the operator to drive the vehicle, while reducing the exposure of the operator to enemy weaponry in a surrounding combat environment.

One of the shortcomings of conventional optical navigation systems is that the two-dimensional images produced by the displays lack a sensation of depth, which can lead to operator disorientation and navigational errors with serious consequences, particularly in combat situations. Although stereoscopic imaging technology, which produces so called 3-D stereo images, i.e., two-dimensional images having a sensation of depth, has been in existence for many years, prior art stereoscopic imaging technology is not readily adaptable to visual navigation applications for vehicles having severe space constraints, which is typical of most land-based military vehicles. Prior art stereoscopic imaging assemblies generally employ CRT displays, which are effective for their intended purpose, but are relatively cumbersome. Size constraints make CRT displays prohibitively bulky for most military applications as well as many civilian applications.

Flat panel displays can meet the size constraints for military applications, but to date have not met the performance requirements for stereoscopic imaging assemblies. The present invention recognizes a need for integrating a relatively small display into an effective stereoscopic imaging assembly.

Accordingly, it is an object of the present invention to provide an effective stereoscopic imaging assembly which employs a flat panel display to substantially reduce the size requirements of the assembly. More particularly, it is an object of the present invention to provide an effective stereoscopic imaging assembly simultaneously providing the observer with a right visual image and a left visual image on the viewing panel of the flat panel display which the observer can synthesize into a single stereoscopic visual image. It is another object of the present invention to provide an effective stereoscopic imaging assembly which provides the observer with both the right and left visual images distributed across the viewing panel of the flat panel display.

It is still another object of the present invention to provide an effective stereoscopic imaging assembly which provides the observer with fully integrated right and left visual images evenly distributed across the entire viewing panel of the flat panel display to eliminate half-black imaging. It is a further object of the present invention to provide an effective stereoscopic imaging assembly which integrates the polarization-defining front polarizer with the image pixels of the flat panel display. It is yet a further object of the present invention to provide an effective stereoscopic imaging assembly which provides the observer with right and left visual images with corrected parallax to eliminate or reduce ghosting from the output of the flat panel display.

These objects and others are accomplished in accordance with the invention described hereafter.

SUMMARY OF THE INVENTION

The present invention is a display for a stereoscopic imaging assembly. The invention is additionally a stereoscopic imaging assembly which includes a display, an analyzer and, in accordance a preferred embodiment, an image source. The invention is also a method for operating a stereoscopic imaging assembly having an image source, a display, and an analyzer to convert a true visual image to a stereoscopic image.

The image source of the stereoscopic imaging assembly is a device for receiving a first true optical image and a second true optical image of a real-life subject. The image source converts the first true optical image to a first electronic image and converts the second true optical image to a second electronic image. Both the first and second electronic images are transmittable to the display.

The display includes first image pixels, second image pixels, and a heterogeneous polarizer. The display is preferably a liquid crystal display having a liquid crystal material, the first and second pixels being comprised of the liquid crystal material. In any case, the first and second image pixels are arranged in a pixel distribution pattern. The first image pixels are responsive to the first electronic image and enable transmission of a first image therefrom. The second image pixels are responsive to the second electronic image and enable transmission of a second image therefrom.

The heterogeneous polarizer has a first polarization material and a second polarization material. The first and second polarization materials are arranged in a polarization pattern which is correlated with the pixel distribution pattern. The first polarization material enables transmission of light of a first polarity therethrough, while essentially blocking transmission of light of a second polarity therethrough. As a result, the first polarization material transmits a first polarized image which has the first polarity and corresponds to the first image. The second polarization material enables transmission of light of the second polarity therethrough, while essentially blocking transmission of light of the first polarity therethrough. As a result, the second polarization material transmits a second polarized image, which has the second polarity and corresponds to the second image.

In accordance with a preferred embodiment, the heterogeneous polarizer of the display is a front polarizer positioned in front of the first and second image pixels. The front polarizer is preferably sufficiently closely coupled with the first and second image pixels and/or has a thickness selected sufficiently thin to substantially diminish parallax of the first and second polarized images. The front polarizer more preferably has a thickness of about 1 micron or less.

The display further includes a rear polarizer positioned in the rear of the first and second image pixels. In accordance with one alternative, the rear polarizer is homogeneous, polarizing all light contacting the rear polarizer to light of a single polarity. In accordance with another alternative, the rear polarizer is heterogeneous having a first polarization material and a second polarization material arranged in the polarization pattern of the front polarizer. The first polarization material of the rear polarizer is preferably essentially identical to the first polarization material of the front polarizer and the second polarization material of the rear polarizer is essentially identical to the second polarization material of the front polarizer. As such, the first polarization material enables transmission of light of the first polarity therethrough, while essentially blocking transmission of light of the second polarity therethrough. The second polarization material enables transmission of light of the second polarity therethrough, while essentially blocking transmission of light of the first polarity therethrough.

In accordance with another preferred embodiment, the display further includes means for substantially eliminating half-black imaging received by the first and second eyes. In accordance with a number of still different preferred embodiments, the display further includes a backlight source, a front plate, a diffuser, and/or an integrator. When the backlight source is present, the rear polarizer is preferably positioned between the backlight source and the first and second image pixels. When the front plate is present, the front polarizer is preferably positioned between the front plate and the first and second image pixels. When the diffuser is present, the front polarizer is preferably positioned between the diffuser and the first and second image pixels. When the integrator is present, the front polarizer is preferably positioned between the integrator and the first and second image pixels.

The analyzer has a first analyzer unit which enables transmission of the first polarized image from the display to a first eye of an observer, while essentially blocking transmission of the second polarized image. The analyzer also has a second analyzer unit which enables transmission of the second polarized image from the display to a second eye of the observer, while essentially blocking transmission of the first polarized image. Thus, the analyzer enables the first eye to receive the first polarized image and the second eye to receive the second polarized image and enables the observer to synthesize the first and second polarized images into a stereoscopic visual image. The analyzer is preferably eyewear configured to be worn over the first and second eyes of the observer, the first analyzer unit being a first eyepiece and the second analyzer unit being a second eyepiece.

The method of operating a stereoscopic imaging assembly is initiated by directing an image source at a real-life subject. The image source receives a first true visual image and a second true visual image of the real-life subject and converts the first true visual image to a first electronic image and the second true visual image to a second electronic image. The first and second electronic images are transmitted to a liquid crystal display. The liquid crystal display has first image pixels comprised of a liquid crystal material with optical properties and has second image pixels comprised of a liquid crystal material with optical properties. The first and second image pixels are arranged in a pixel distribution pattern.

The liquid crystal material of the first image pixels transitions between different optically-determinative orientations in response to the first electronic image and the liquid crystal material of the second image pixels transitions between different optically-determinative orientations in response to the second electronic image. The optical properties of the liquid crystal material of the first and second image pixels vary as a function of the optically-determinative orientations.

Backlighting is directed onto the liquid crystal material of the first and second image pixels while simultaneously performing the above-recited transitioning step. The backlighting is blocked or transmitted in whole or in part through the first image pixels in response to the optically-determinative orientations of the liquid crystal material of the first image pixels to create a first image. The backlighting is similarly blocked or transmitted in whole or in part through the second image pixels in response to the optically-determinative orientations of the liquid crystal material of the second image pixels to create a second image;

A heterogeneous polarizer is provided having a first polarization material enabling transmission of light of a first polarity therethrough while blocking transmission of light of a second polarity therethrough. The heterogeneous polarizer also has a second polarization material enabling transmission of light of the second polarity therethrough while blocking transmission of light of the first polarity therethrough. The first and second polarization materials are arranged in a polarization pattern. The first image is polarized by directing the first image onto the first polarization material to convert the first image to a first polarized image having the first polarity. The second image is polarized by directing the second image onto the second polarization material to convert the second image to a second polarized image having the second polarity.

A first analyzer unit is provided which enables transmission of the first polarized image therethrough, while essentially blocking transmission of the second polarized image therethrough. A second analyzer unit is also provided which enables transmission of the second polarized image therethrough, while essentially blocking transmission of the first polarized image therethrough: The first analyzer unit is positioned between the heterogeneous polarizer and a first eye of an observer so that the first eye receives the first polarized image, but not the second polarized image. The second analyzer unit is positioned between the heterogeneous polarizer and a second eye of the observer so that the second eye receives the second polarized image, but not the first polarized image.

In accordance with a preferred embodiment, the method further comprises the observer synthesizing the first and second polarized images into a stereoscopic visual image. The method also further comprises, providing a viewing panel to visually display the first and second polarized to the observer. The first and second polarized images are more preferably continuously displayed on the viewing panel and parallax of the first and second polarized images is substantially diminished. The first polarized image preferably simultaneously fills an entirety of the viewing panel, while the second polarized image fills the entirety of the viewing panel to substantially eliminate half-black imaging received by the first and second eyes.

In accordance with additional preferred embodiments, the method further comprises polarizing the backlighting to a single polarity before the first and second image pixels. The method also further comprises providing a heterogeneous rear polarizer between a backlight source of the backlighting and the first and second image pixels. The heterogeneous rear polarizer has a first polarization material and a second polarization material arranged in the polarization pattern of the heterogeneous polarizer. The first polarization material enables transmission of light of the first polarity therethrough, while essentially blocking transmission of light of the second polarity therethrough. The second polarization material enables transmission of light of the second polarity therethrough, while essentially blocking transmission of light of the first polarity therethrough. A first portion of the backlighting is polarized to the first polarity by directing the first portion of the backlighting onto the first polarization material and a second portion of the backlighting is polarized to the second polarity by directing the second portion of the backlighting onto the second polarization material.

The present invention will be further understood from the drawings and the following detailed description.

DESCRIPTION OF PREFERRED EMBODIMENTS

Figure 1:
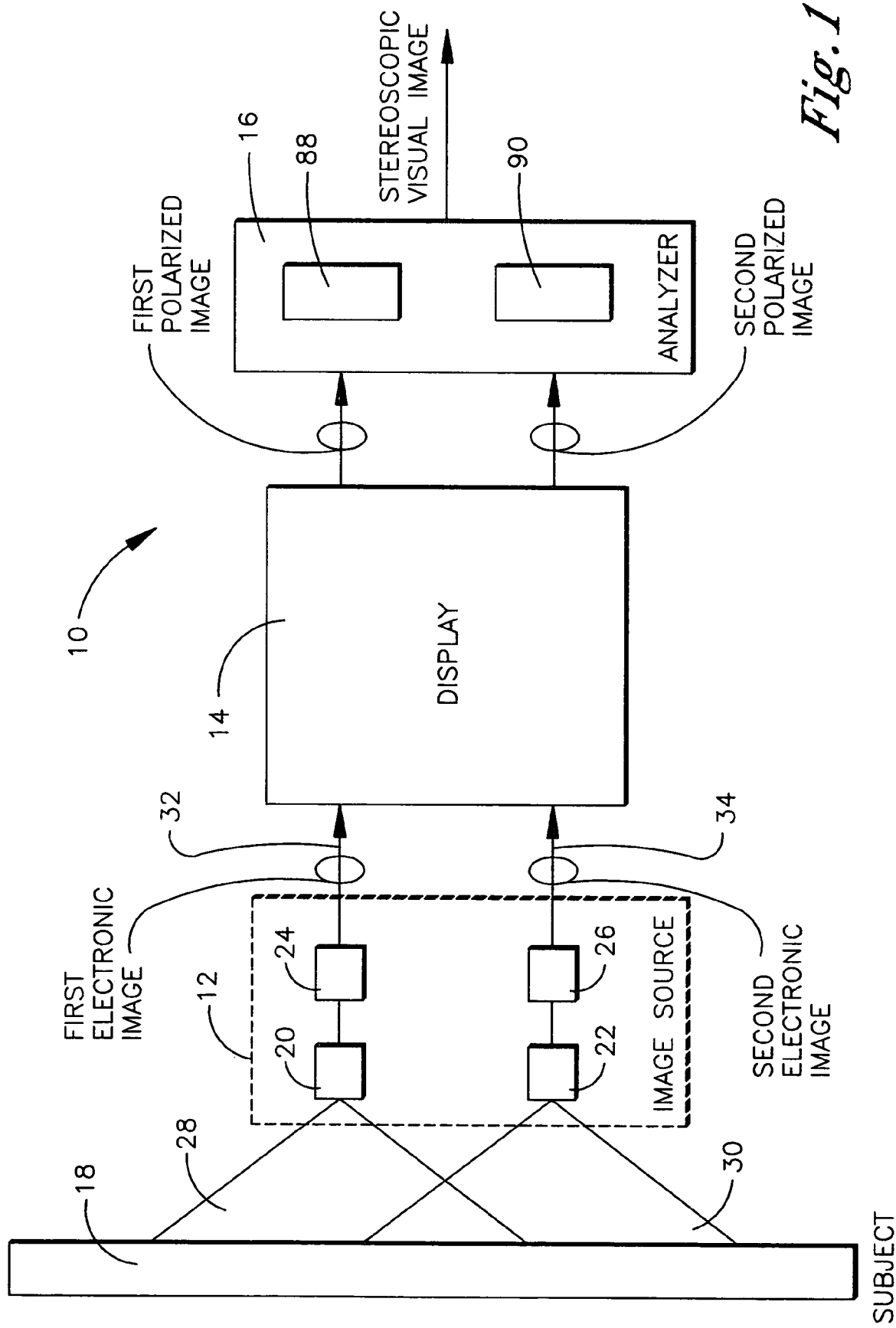
FIG. 1 is a schematic block diagram of a stereoscopic imaging assembly of the present invention.

Referring to FIG. 1, an embodiment of the stereoscopic imaging assembly of the present invention is shown and generally designated 10. The stereoscopic imaging assembly 10 has a plurality of components functioning in series along an image pathway, which extends from an image source to an analyzer. In particular, the stereoscopic imaging assembly 10 comprises an image source 12, a display 14, and an analyzer 16. The stereoscopic imaging assembly 10 has general utility to essentially any application which requires or benefits from the conversion of a true visual image of a subject 18 to a stereoscopic visual image of the subject 18 for viewing by a person having visual access to the display 14 and analyzer 16, but not necessarily to the subject 18. The stereoscopic imaging assembly 10 is described below in the context of a specific application, i.e., visual navigation of a vehicle, for purposes of illustrating a preferred embodiment of the stereoscopic imaging assembly 10. However, it is understood that the stereoscopic imaging assembly of the present invention is not limited to the specific application described herein. It is further understood that the stereoscopic imaging assembly may be coupled or integrated with other imaging assemblies, such as infra-red imaging, for enhanced functionality in any number of applications including vehicle navigation applications.

An image source in its broadest sense is essentially any device providing electronic images to a display, which are ultimately converted to visual images. By definition, an electronic image is not visually perceptible to a person, while a visual image is visually perceptible to a person. The electronic image is a non-visual representation of a visual image of a real-life or artificial subject. The electronic image is electronically formatted for storage or transmission in either a digital or analog format and requires processing for conversion to a visual image.

In accordance with visual navigation applications generally, the image source is a device, which receives a true visual image of a real-life subject and converts the true visual image to an electronic image. The electronic image is in the format of an electronic signal which is transmittable to the display. One such image source is a conventional electro-optical device, generally termed a camera, which comprises an optical receiver and associated electronic circuitry. The optical receiver receives the true visual image, which the optical receiver may modify, for example, by restricting, magnifying, or expanding the true visual image to define a received image. The electronic circuitry subsequently converts the received image to the electronic image.

A preferred image source 12 shown in FIG. 1 is a stereoscopic camera, which comprises first and second optical receiving units 20, 22 and first and second electronic circuitry 24, 26 associated with the first and second optical receiving units 20, 22, respectively. The first and second electronic circuitry 24, 26 are represented conceptually herein as dedicated circuitry separate and distinct from each other and from their respective first and second optical receiving units 20, 22. However, it is understood that each dedicated first and second electronic circuitry 24, 26 may be integral with its respective first and second optical receiving unit 20, 22. Alternatively, the first and second electronic circuitry 24, 26 may be a unitary circuitry shared by the first and second optical receiving units 20, 22. In any case, the function of the image source is essentially the same regardless of which image source configuration is used in the practice of the present invention.

The first and second optical receiving units 20, 22 are preferably positioned to simulate the right and left eyes, respectively, of a person. Accordingly the first (right) and second (left) optical receiving units 20, 22 are positioned side by side a distance apart from one another so that the first and second optical receiving units 20, 22 have different, but preferably overlapping, first (right) and second (left) fields of vision 28, 30, respectively. The first optical receiving unit 20 receives a first (right) true visual image of the subject 18 from a first (right) perspective to produce a first (right) received image. The first (right) electronic circuitry 24 subsequently converts the first received image to a first (right) electronic image, i.e., a first (right) transmittable signal. The second optical receiving unit 22 correspondingly receives a second (left) true visual image of the subject 18 from a second (left) perspective different from the first perspective to produce a second (left) received image. The second (left) electronic circuitry 26 converts the second received image to a second (left) electronic image, i.e., a second (left) transmittable signal.

In accordance with the present visual navigation application, the first and second optical receiving units 20, 22 are mounted on the exterior of a vehicle (not shown), which employs the stereoscopic imaging assembly 10. The first and second optical receiving units 20, 22 are mounted side by side a distance of a few inches or more apart from one another and directed at the real-life subject 18, which is the three-dimensional environment surrounding the vehicle. The position of the first and second optical receiving units 20, 22 relative to the vehicle may be fixed and preferably oriented in the direction the vehicle is normally driven. Alternatively, the position of the first and second optical receiving units 20, 22 relative to the vehicle may be adjustable to an orientation other than the direction the vehicle is being driven. Adjustment is preferably controlled by the assembly operator, a person who is typically also the vehicle operator. Where the position of the first and second optical receiving units 20, 22 relative to the vehicle is adjustable, it is nevertheless preferable to maintain the position of the first and second optical receiving units 20, 22 relative to each other fixed to simulate the relative positioning of the human eyes.

The display 14 and remaining components of the stereoscopic imaging assembly 10 downstream of the image source 12 are preferably remotely positioned in the interior of the vehicle, where the downstream components are accessible to the assembly operator, who likewise resides in the interior of the vehicle. Typically, the assembly operator lacks visual access to the real-life subject 18 or is otherwise in visual isolation from the real-life subject 18. For example, the direct sight line of the assembly operator to the real-life subject 18 may be physically blocked, thereby necessitating use of the stereoscopic imaging assembly 10 for visual navigation of the vehicle. First and second electronic image paths 32, 34 are provided for communicating the first and second electronic images, respectively, which are output from the image source 12 to the display 14. As such, the first and second electronic image paths 32, 34 extend between the display 14, which is interior to the vehicle, and the first and second electronic circuitry 24, 26, respectively, which may be exterior or interior to the vehicle.

The first and second electronic image paths 32, 34 are each represented conceptually herein as a dedicated electronic image path separate and distinct from the other. However, it is understood that the first and second electronic image paths 32, 34 may be a unitary electronic image path shared by the first and second electronic circuitry 24, 26. Regardless of whether the first and second electronic image paths 32, 34 are separate or shared, the first and second electronic image paths 32, 34 may be a direct physical linkage, such as hard wiring or optical fiber, which carries the first and second electronic images to the display 14. Alternatively, the first and second electronic image paths 32, 34 may simply be air space, through which the first and second electronic images are transmitted to the display 14 in the absence of a direct physical linkage.

The display 14 is a flat panel display and preferably a liquid crystal display (LCD), which operates at a conventional frame rate, for example, 60 Hz. In addition, the display 14 preferably has high resolution, which is defined as having at least about 80 pixels per inch and preferably exceeding 120 pixels per inch. A first example of an LCD having utility as a display 14 in the stereoscopic imaging assembly 10 has a small viewing panel size of 10.4 inches and a resolution of 1024×768 pixels or 133 pixels per inch. The pixel pitch (and correspondingly the line pitch) is 0.2055 mm and the active image size is 210.4×157.8 mm. A second example of an LCD having utility as a display 14 in the stereoscopic imaging assembly 10 has a laptop viewing panel size of 15 inches and a resolution of 1600×1200 pixels. The pixel pitch (and correspondingly the line pitch) is 0.1905 mm and the active image size is 304.8×228.6 mm. A third example of an LCD having utility as a display 14 in the stereoscopic imaging assembly 10 has a large viewing panel size of 21.3 inches and a resolution of 1600×1200 pixels or 94 pixels per inch. The pixel pitch (and correspondingly the line pitch) is 0.27 mm and the active image size is 432×324 mm.

A conventional LCD generally comprises a flat LC cell formed from two closely-spaced parallel glass plates, i.e., a back plate and a front plate. The thickness of each plate is commonly on the order of about 0.7 mm. Back and front electrode layers are deposited on the inner surfaces of the back and front plates, respectively. The electrode layers are commonly formed from an optically transparent, electrically conductive material, such as tin oxide or indium oxide. Back and front polarizers are laminated onto the outer surfaces of the back and front plates, respectively. The back and front polarizers are characterized as ordinary homogeneous polarizers, each having a continuous homogeneous polarization pattern across its entire surface to uniformly polarize the light passing therethrough to a single polarity. The back and front polarizers are commonly aligned so that light polarized by the back polarizer can freely pass through the front polarizer when the front polarizer is positioned downstream of the back polarizer. For example, both the back and front polarizers may be linear vertical polarizers, which transmit vertically polarized light while absorbing horizontally polarized light. Conversely, both the back and front polarizers may be linear horizontal polarizers, which transmit horizontally polarized light while absorbing vertically polarized light.

The separation space between the back and front plates bounded by the inner surfaces is typically a very small distance on the order of about 5 microns. The separation space is filled with a liquid crystal material and sealed around the edges to retain the liquid crystal material therein. The molecules of the liquid crystal material are all characterized as having a common resting orientation in the absence of an electric drive voltage. When the molecules are in the resting orientation, they exhibit specific common optical properties in correspondence with the resting orientation. For example, the common resting orientation of the molecules of the liquid crystal material may be aligned polarization, i.e., white, in the absence of an electric drive voltage.

The resting orientation of the molecules can be disrupted by applying an electric drive voltage between the back and front electrodes across the liquid crystal material. The drive voltage transitions the molecules from the resting orientation to a disrupted orientation distinct from the resting orientation. When the molecules of the liquid crystal material are in the disrupted orientation, they exhibit specific common optical properties in correspondence with the disrupted orientation, which are different from the optical properties of the molecules in the resting orientation. Thus, if the resting orientation is white or aligned polarization as in the present example, the disrupted orientation is black or blocked polarization. The drive voltage can also transition the molecules of the liquid crystal material from the resting orientation to partial disrupted orientations by varying the drive voltage applied across the liquid crystal material. Partial disrupted orientations are essentially orientations between the resting and disrupted orientations. When the molecules of the liquid crystal material are in a partial disrupted orientation, they exhibit specific common optical properties in correspondence with the particular degree of the partial disrupted orientation, which are different from the optical properties of the molecules in the resting or disrupted orientation. The partial disrupted orientation of the molecules is gray or partially blocked polarization.

Visual images are projected on the viewing panel of the LCD by directing backlighting toward the LC cell from a backlight source behind the LC cell. The back polarizer polarizes the backlight, transmitting the polarized backlight into the liquid crystal material. If the orientation of the molecules of the liquid crystal material receiving the polarized backlight is white or aligned polarization, the liquid crystal material does not optically modulate the polarized backlight. As a result, the backlight freely passes through the front polarizer where it is visible on the viewing panel. If the orientation of the molecules of the liquid crystal material receiving the polarized backlight is black or blocked polarization, the liquid crystal material optically modulates the polarized backlight. As a result, the front polarizer blocks the backlight from passing through so that the backlight is not visible on the viewing panel, which remains dark. By selectively applying electric drive voltages between specified electrodes on the back and/or front plates of the LC cell to align the molecules of the liquid crystal material in the disrupted orientation at the pixel locations where the drive voltage is applied, while maintaining the molecules of the liquid crystal material in the resting orientation at the remaining pixel locations where the drive voltage is absent, a pattern of light and darkness is created on the viewing panel, which corresponds to a visual image.

Figure 2:
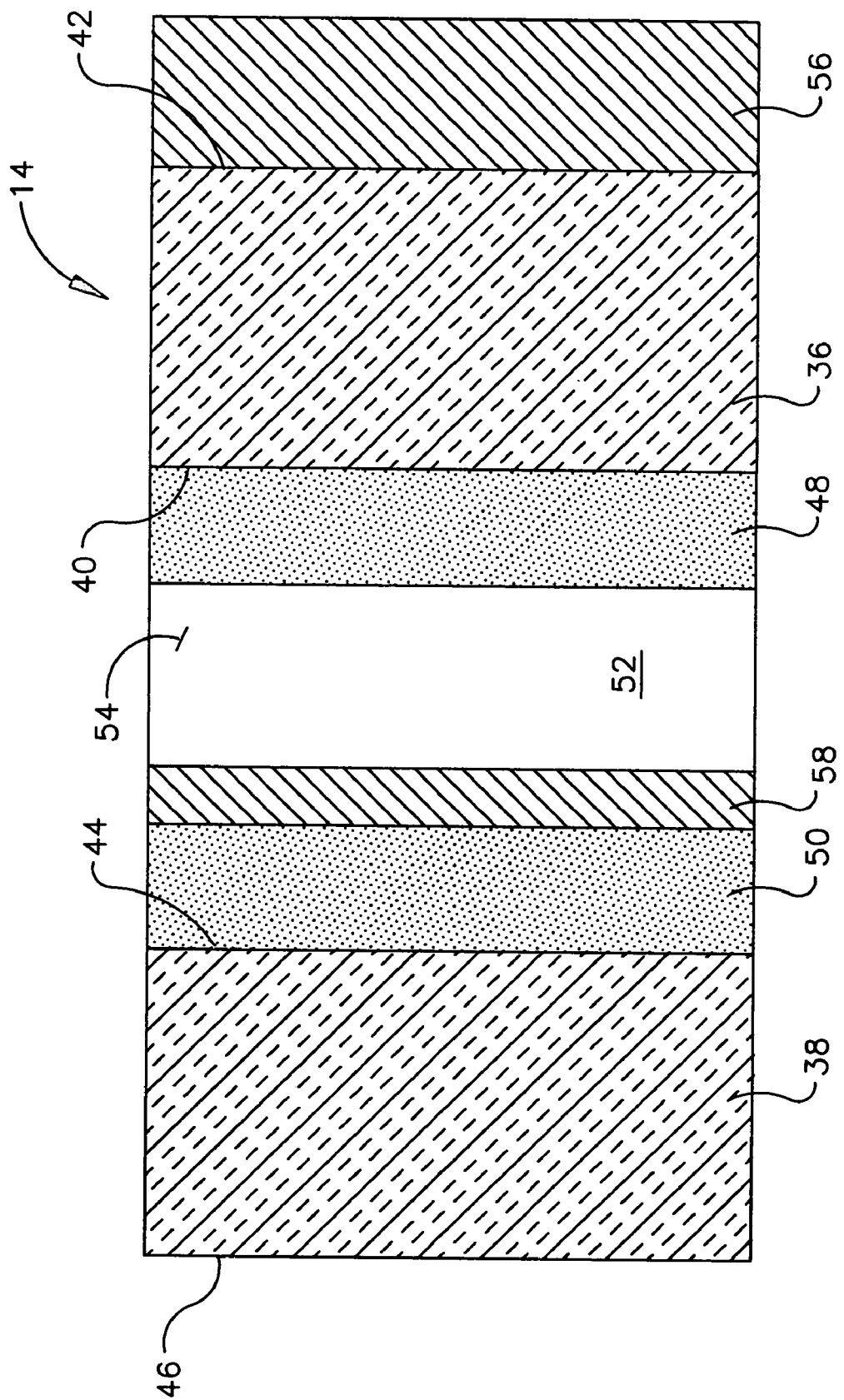
FIG. 2 is a conceptualized cross-section of a liquid crystal cell and polarizers employed in the stereoscopic imaging assembly of FIG. 1.

A preferred display 14 differs from the above-recited conventional LCD in the construction of the front polarizer and the placement of the front polarizer relative to the front plate. Referring to FIG. 2, the display 14 comprises a back plate 36 and a front plate 38. The back plate 36 has an inner surface 40 and an outer surface 42 and the front plate 38 correspondingly has an inner surface 44 and an outer surface 46. Back and front electrode layers 48, 50 are deposited on the inner surfaces 40, 44. A liquid crystal material 52 is interposed in the separation space 54 between the back and front plates 36, 38. A back polarizer 56 is provided, which may be laminated onto the outer surface 42 of the back plate 36. The back polarizer 56 is an ordinary homogeneous polarizer, as described above with respect to a conventional LCD, which functions in essentially the same manner. Although not shown, it is understood that a backlight source, such as a cold cathode flourescent lamp, is positioned behind the back polarizer 56. The backlight source is characterized as a highly diffuse light source.

The display 14 is also provided with a front polarizer 58. However, rather than laminating the front polarizer 58 to the outer surface 46 of the front plate 38 in the manner of a conventional LCD, the front polarizer 58 is preferably coated on the inner surface 44 of the front plate 38. Coating the front polarizer 58 on the inner surface 44 encompasses either positioning the front polarizer 58 between the front electrode layer 50 and the liquid crystal material 52 as shown or between the front electrode layer 50 and inner surface 44 not shown. The front polarizer 58 is characterized as a heterogeneous polarizer because the front polarizer 58 has a heterogeneous polarization pattern across its surface which is segmented into sections of separate and distinct polarizations enabling the polarizer to provide light passing through the front polarizer 58 with different polarities as a function of the location of the light relative to the surface of the front polarizer 58. Further details of the construction of the front polarizer 58 are described below.

Referring back to FIG. 1, the first and second electronic circuitry 24, 26 transmit the first and second electronic images, respectively, to the display 14 via the first and second electronic image paths 32, 34. The electronics of the display 14 are configured such that the electronic feed to a first portion of the pixels of the display 14 is the first electronic image exclusively, while the electronic feed to a second remaining portion of the pixels is the second electronic image exclusively. The first portion of pixels, termed the first (right) image pixels, are preferably essentially half of the pixels of the display 14, while the second portion of pixels, termed the second (left) image pixels, are preferably essentially the remaining half of the pixels of the display 14. The present invention is not limited to any specific distribution pattern of the first image and second image pixels across the viewing panel of the display 14. However, the first and second image pixels are preferably relatively evenly distributed across the viewing panel so that no adequately-sized representative sampling of the viewing panel contains pixel clusters having a disproportionately high concentration of the first or second image pixels.

A number of pixel distribution patterns are possible which provide the desired relatively even pixel distribution. For example, the pixels may be arranged in a pixel checkerboard pattern with each pixel in sequence alternating between a first image pixel and a second image pixel to produce a relatively even pixel distribution. Alternatively, the pixels may be arranged in a series of pixel rows with each pixel row preferably being the height of a single pixel. All of the pixels in the initial pixel row consist entirely of the first or second image pixels. All of the pixels in the next adjoining pixel row consist entirely of the image pixels opposite the image pixels of the preceding pixel row. For example, if the initial pixel row is entirely first image pixels, the next adjoining pixel row is entirely second image pixels, the next adjoining pixel row is entirely first image pixels, and so on. This alternating pixel row pattern is repeated across the entire height of the viewing panel to provide a relatively even pixel distribution.

The front polarizer 58 of the stereoscopic imaging assembly 10 is preferably constructed from a polarization material, which is configured as a thin crystal film (TCF) and, as noted above, is coated on the inner surface 44 of the front plate 38. Such a preferred polarization material is known by the trade name Optiva TCF and is commercially available from Optiva, Inc., 377 Oyster Point Blvd., Unit 13, South San Francisco, Calif. 94080, U.S.A. Representative Optiva TCF polarization materials are disclosed in U.S. Pat. No. 6,049,428 assigned to Optiva, Inc. and incorporated herein by reference. Optiva TCF polarization materials are inter alia characterized as being extremely thin, i.e., on the order of about 1 micron or less. Reduced thickness is an advantageous characteristic because it enhances miniaturization of the resulting assembly if desired. Optiva TCF polarization materials are also characterized as being highly heat resistant, i.e., resistant to thermal degradation after exposure to temperatures up to about 200° C. Heat resistance is an advantageous characteristic because it enables positioning the front polarizer 58 proximal to the front electrode layer 50 and liquid crystal material 52 where significant heat is generated and high temperatures are experienced during the display manufacturing process.

Internally positioning the polarization-defining front polarizer 58 proximal to the liquid crystal material 52 (i.e., the image pixels), rather than externally positioning the front polarizer 58 in a conventional manner with the front plate 38 intervening between the front polarizer 58 and the image pixels, substantially diminishes undesirable parallax. The extreme thinness of the front polarizer 58 relative to conventional polarizers also contributes to diminution of undesirable parallax. Thus, reducing the thickness of the front polarizer 58 and closely coupling the front polarizer 58 with the image pixels enables the single display 14 to simultaneously provide distinct first and second polarized images, which are derived from the first and second electronic images, respectively, with minimal "ghosting" or cross talk between the first and second polarized images.

The front polarizer 58 is preferably configured with a heterogeneous polarization pattern which corresponds to the pixel distribution pattern of the display 14. For example, if the pixel distribution pattern of the display 14 is an alternating pixel row pattern, as described above, the polarization pattern of the front polarizer 58 is likewise an alternating polarization row pattern, wherein each polarization row of the front polarizer 58 optically aligns with a corresponding pixel row of the display 14.

Figure 3:
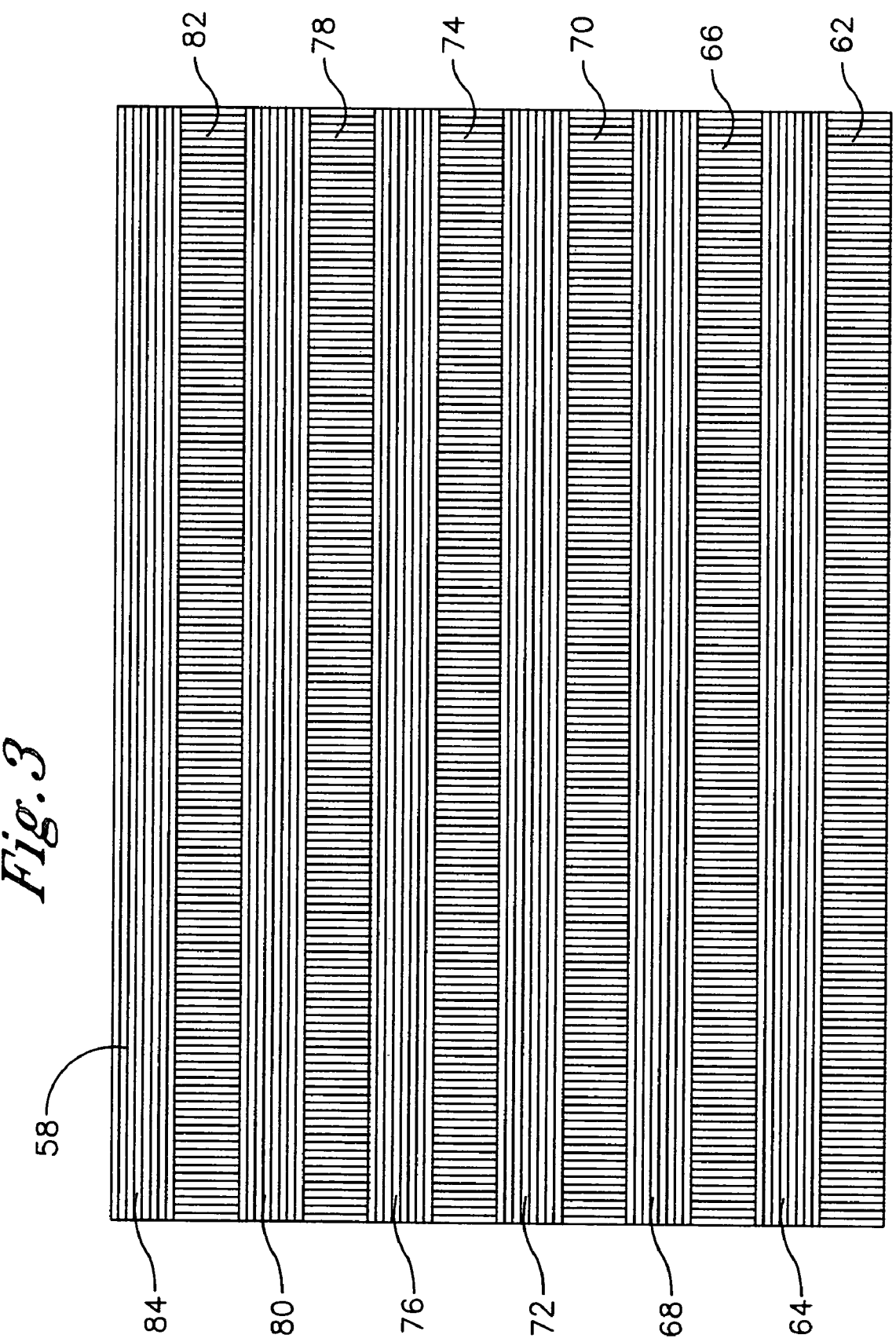
FIG. 3 is a conceptualized view of a front polarizer having an exemplary polarization pattern, which is employed in the stereoscopic imaging assembly of FIG. 1.

FIG. 3 shows a conceptualized front polarizer 58 having an exemplary alternating polarization row pattern, wherein each polarization row 62, 64, 66, 68, 70, 72, 74, 76, 78, 80, 82, 84 of the polarization pattern has essentially the same height as a single first or second image pixel row. The initial polarization row 62 of the polarization pattern (starting at the bottom) is exclusively a vertical polarization row. Thus, the initial polarization row 62 is formed from an appropriately selected linear vertical polarization material, which only permits linearly vertically polarized light to pass through. The next adjoining polarization row 64 of the polarization pattern is exclusively a horizontal polarization row. Thus, the next adjoining polarization row 64 is formed from an appropriately selected linear horizontal polarization material, which only permits linearly horizontally polarized light to pass through. The next adjoining polarization row 66 of the polarization pattern is exclusively a vertical polarization row and so on. In sum, alternating polarization rows 62, 66, 70, 74, 78, 82 are vertical polarization rows and alternating polarization rows 64, 68, 72, 76, 80, 84 are horizontal polarization rows.

Although only a limited number of polarization rows are shown in FIG. 3 for purposes of illustration, in practice there is one polarization row in the front polarizer 58 for every pixel row in the display 14. Thus, there is a one-to-one correspondence between the pixel rows of the display 14 and the polarization rows of the front polarizer 58. Each pixel row is in essentially identical optical alignment with its corresponding polarization row so that essentially all light emitted from a given pixel row passes through its corresponding polarization row with the exception of a small degree of inherent scattering, which causes a relatively insignificant amount of light emitted from a given pixel row to migrate into the polarization rows adjoining its corresponding polarization row.

The front polarizer 58 having an alternating polarization row pattern is preferably manufactured by a sequential coating process. For example, a coating of the selected linear vertical polarization material may initially be uniformly applied across the entirety of the front electrode layer 50 or the inner surface 44 of the front plate 38. A masking is applied only to the coating on the vertical polarization rows, which are patterned on the front electrode layer 50 or the inner surface 44 of the front plate 38. The coating of selected linear vertical polarization material is then removed only from the unmasked horizontal polarization rows. A coating of the selected linear horizontal polarization material is applied across the entirety of the front electrode layer 50 or the inner surface 44 of the front plate 38. A masking is applied only to the coating on the horizontal polarization rows and the coating of selected linear horizontal polarization material is removed only from the vertical polarization rows. Finally, the masking is removed from both the vertical and horizontal polarization rows.

Figure 4:
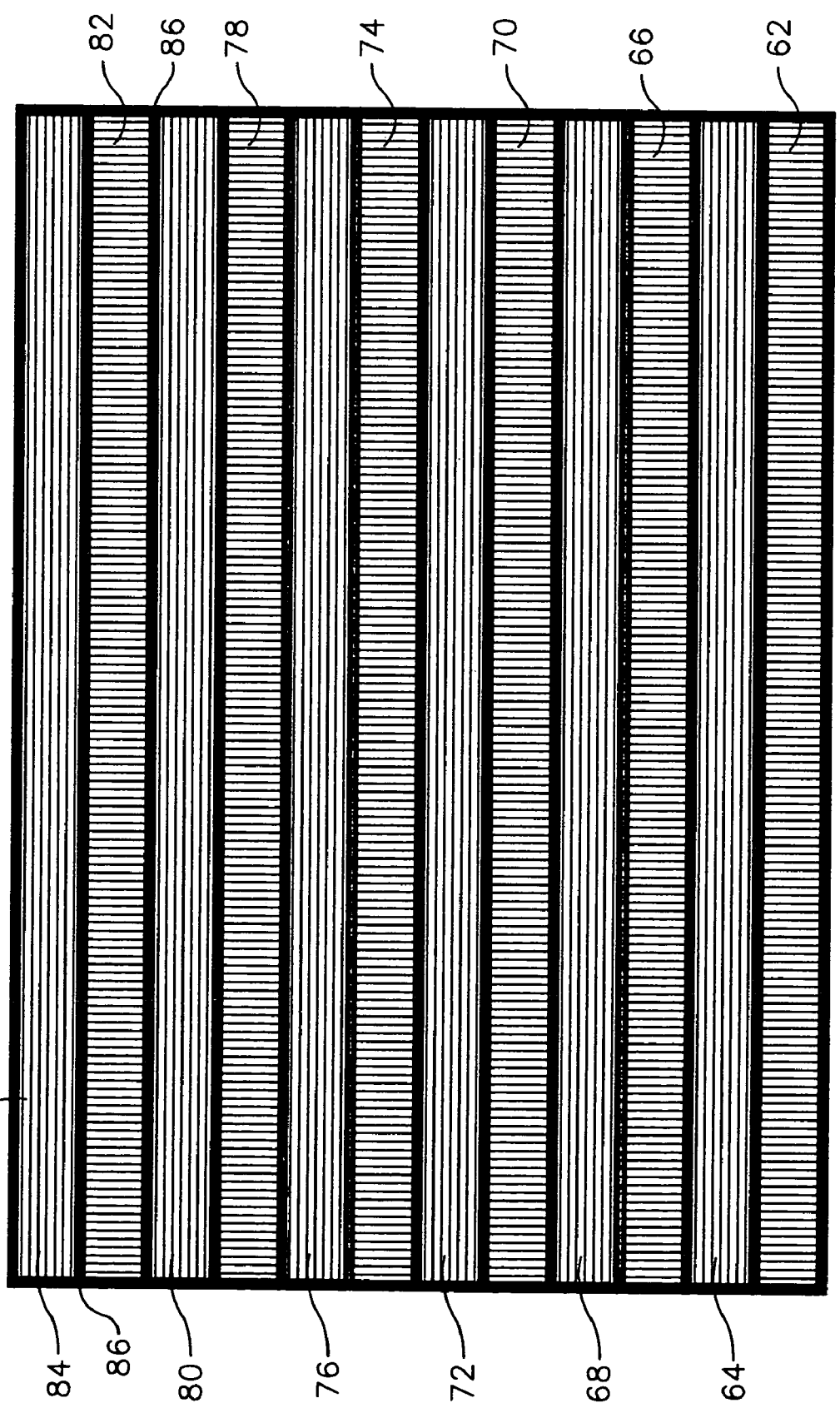
FIG. 4 is a conceptualized view of an alternate embodiment of a front polarizer which has the polarization pattern of FIG. 3, but which also has a black mask.

Referring to FIG. 4, an alternate embodiment of the front polarizer 58 is shown having the same polarization pattern as FIG. 3, but having a black mask 86 deposited at the interface of each adjoining polarization row. The black mask 86 is formed from a material which is essentially opaque, i.e., is not light transmissive. The black mask 86 functions to reduce crosstalk between the polarization rows caused by parallax. Alternatively, although not shown, crosstalk can be reduced by providing a slight overlap of the linear horizontal and vertical polarization materials at the interface of each adjoining polarization row.

As noted above, other pixel distribution patterns for the display in addition to the alternating pixel row pattern are within the scope of the present invention. If a different pixel distribution pattern is selected for the display, a polarization pattern is selected for the front polarizer which corresponds to the selected pixel distribution pattern in accordance with the principles of the above-recited teaching. Thus, for example, if a pixel checkerboard pattern is selected for the display, a polarization checkerboard pattern is correspondingly selected for the front polarizer. Furthermore, it is apparent to the skilled artisan that the front polarizer may employ other paired first and second opposing polarities as an alternative to the linear horizontal and vertical polarities shown and described above. For example, the front polarizer may alternatively employ linear odd- and even-line (opposingly diagonal line) polarities or clockwise and counterclockwise circular polarities.

The back polarizer 56 is shown and described above as being an ordinary homogenous polarizer, which is laminated onto the outer surface 42 of the back plate 36. The back polarizer 56 may, be example, be constructed from either the selected linear horizontal or vertical polarization material of the front polarizer 58 (but not both). Since the back polarizer 56 has a single axis of linear polarization, i.e., either vertical or horizontal, the black-to-white correlation of the pixel rows to the drive voltage of the LC cell is reversed for the alternate rows of the first image pixels and the second image pixels. Thus, the alternate image pixels produce an inverted drive voltage.

In accordance with alternate embodiments not shown, the back polarizer 56 is coated in a homogeneous polarization pattern on the inner surface 40 of the back plate 36. Alternatively, the back polarizer 56 is coated as a heterogeneous polarization pattern on the inner surface 40 of the back plate 36, which corresponds to the heterogeneous polarization pattern of the front polarizer 58. In another alternative, the front polarizer 58, having essentially the same heterogeneous polarization pattern as described above, may be coated directly on the outer surface 46 of the front plate 38 or coated onto a glass or plastic substrate, which is laminated onto the outer surface 46 of the front plate.

Referring back to FIG. 1, the display 14 effectively converts the first electronic image and the second electronic image received from the image source 12 to a first (right) polarized image having the first polarity and a second (left) polarized image having the second polarity. The first and second polarized images are simultaneously displayed on the viewing panel in correspondence with the selected pixel distribution and polarization patterns of the display 14. For example, if the pixel distribution and polarization patterns are alternating pixel and polarization row patterns, respectively, the alternating rows of the first image pixels and the corresponding alternating rows of the first polarity transmit the first polarized image as a plurality of first polarized image segments, each of which corresponds to a discrete alternate line on the viewing panel. The sum of the alternate lines of the first polarized image segments constitutes the first polarized image. The alternating rows of the second image pixels and the corresponding alternating rows of the second polarity similarly transmit the second polarized image as a plurality of second polarized image segments, each of which corresponds to a discrete alternate line on the viewing panel. The sum of the alternate lines of the second polarized image segments (which are interleaved with the alternate lines of the first polarized image segments) constitutes the second polarized image.

The analyzer 16 of the stereoscopic imaging assembly 10 provides a person who is simultaneously observing the first and second polarized images on the viewing panel of the display 14 with the capability of synthesizing the first and second polarized images into a single stereoscopic visual image. The analyzer 16 is a device which selectively transmits or blocks the first and second polarized images from the display 14 to each eye of the observer. In particular, the first and second polarized images are simultaneously transmitted from the display 14 to both a first (right) analyzer unit 88 and a second (left) analyzer unit 90 of the analyzer 16. The first analyzer unit 88 renders the first polarized image visible to the right eye of the observer and the second polarized image invisible to the right eye. The second analyzer unit 90 renders the second polarized image visible to the left eye of the observer and the first polarized image invisible to the left eye. Accordingly, the observer is able to synthesize the first polarized image from the right eye and the second polarized image from the left eye into a single stereoscopic visual image in the same manner as natural sight.

A preferred first analyzer unit 88 is a first (right) eyepiece 88 for the right eye of the observer and a preferred second analyzer unit 90 is a second (left) eyepiece for the left eye of the observer. The first and second analyzer units 88, 90 may be included in a single pair of eyeglasses or goggles to be worn over the eyes by the observer who is positioned a relatively short distance away from and in view of the display 14.

In operation, the first and second polarized images are simultaneously and continuously displayed on the viewing panel of the display 14. The term "continuously displayed" is used herein to mean that the first and second polarized images are both simultaneously refreshed at the same frequency as the overall frame rate at which the display 14 operates (typically 60 Hz). Accordingly, the first polarized image is always visible to the right eye of the observer, while the second polarized image is always invisible to the right eye. Conversely, the second polarized image is always visible to the left eye of the observer, while the first polarized image is always invisible to the left eye. As a result, the right eye of the observer only sees the first image pixels at any given time, which only reside in every other pixel row on the viewing panel, while the remaining pixel rows appear as black lines to the right eye. Conversely, the left eye only sees the second image pixels at any given time, which only reside in every other pixel row on the viewing panel, while the remaining pixel rows appear as black lines to the left eye. This phenomenon is termed half-black imaging.

The pixel heights are sufficiently small on a high resolution viewing panel, that the invisible pixel rows (i.e., black lines) are almost imperceptible to the observer or can otherwise be ignored by the observer to counter the effects of half-black imaging. Nevertheless, in accordance with an alternate embodiment of the stereoscopic imaging assembly 10, the viewing panel of the display 14 may optionally be provided with additional components for mitigating the visual effects of the black lines by eliminating half-black imaging through a half-black image merging technique.

Figure 5:
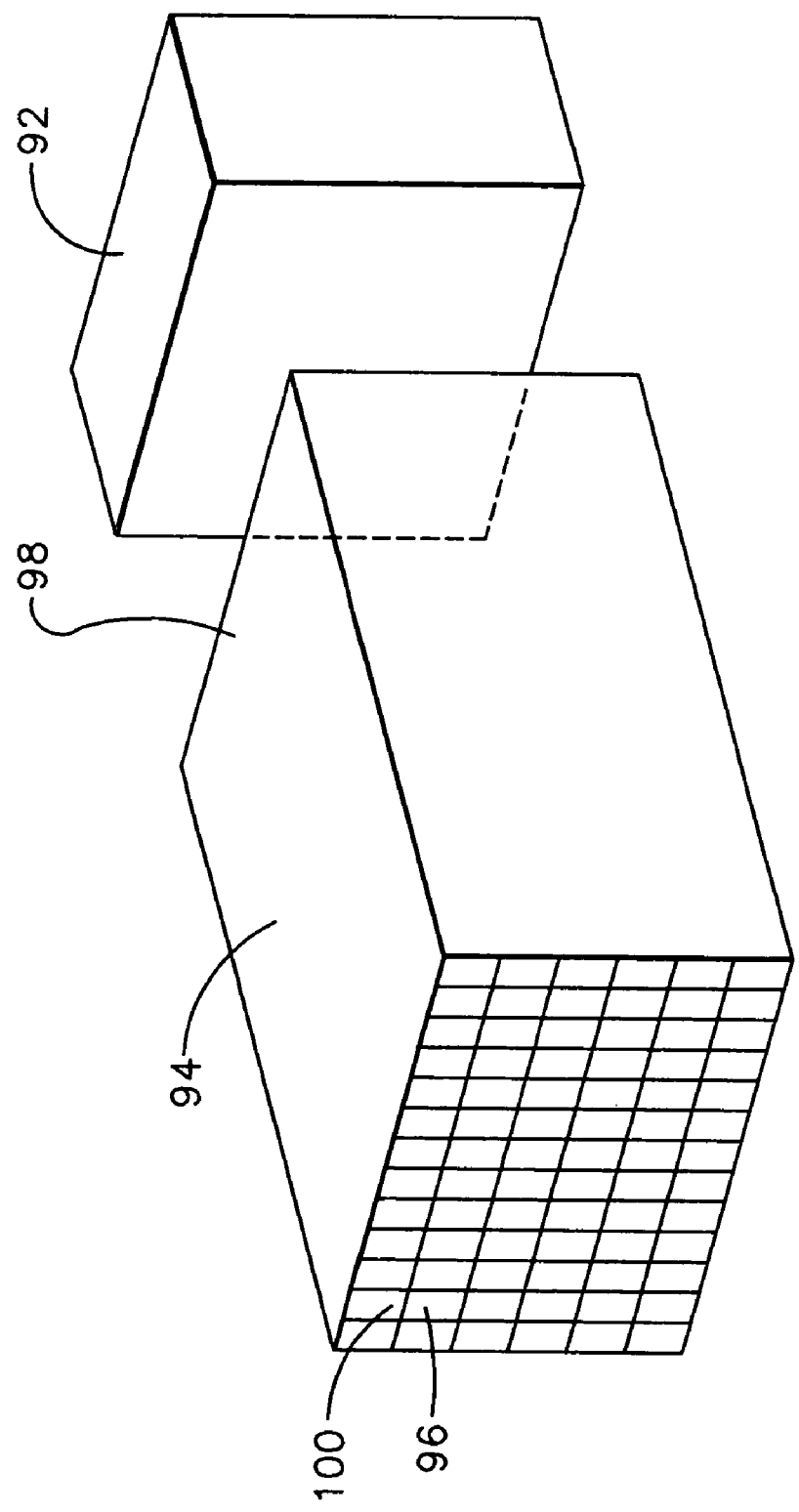
FIG. 5 is a conceptualized exploded perspective view of a diffuser and integrator which are employed in a display of the stereoscopic imaging assembly of FIG. 1.

Referring to FIG. 5, a diffuser 92 and an integrator 94 are serially aligned for mounting on the front of the display 14 with the diffuser 92 more proximal to the LC cell and the integrator 94 acting as the faceplate of the viewing panel. In particular, the diffuser 92 and integrator 94 in combination may be substituted for the front plate 38 shown in FIG. 2 or laminated onto the outer surface 46 of the front plate 38. The diffuser 92 is a device which optically diffracts the first and second polarized images from the front polarizer without substantially depolarizing them. In particular, the diffuser 92 spreads the light from each line of the first polarized image so that each line of the first polarized image entirely overlaps the adjoining line of the second polarized image (which is black to the right eye). The sum of the lines is a first diffracted polarized image, which fills the entire viewing panel. The diffuser 92 similarly spreads the light from each line of the second polarized image so that each line of the second polarized image entirely overlaps the adjoining line of the first polarized image (which is black to the left eye). The sum of the lines is a second diffracted polarized image, which likewise fills the entire viewing panel. Thus, the diffuser 92 simultaneously fills the entire viewing panel with the first diffracted polarized image for the right eye of the observer and the second diffracted polarized image for the left eye, thereby optically eliminating the black lines for each eye.

A preferred diffuser is a transmissive sheet diffuser material, which does not destroy polarization. Such a material is available from Screen-Tech, Seilkamp 6, 25548 Keilinghausen, Hamburg, Germany and is disclosed in U.S. Pat. No. 4,652,084. An alternate diffuser is an array of micro lenses, such as lenticular lenses, each of which is arranged in parallel within a plane and oriented to receive light from two adjoining pixel rows.

The integrator 94 is a device which maintains the integrity of the first and second diffracted polarized images by preventing further spreading of the light past each adjoining line, while integrating the light, i.e., imposing an even distribution of the light over the line from which the light originates and the adjoining line. The analyzer 16 processes the first and second diffracted polarized images in substantially the same manner as described above to synthesize them into a single stereoscopic visual image. A preferred integrator 94 is a plurality of optical fibers 96 stacked side by side into an array, with a first end 98 of each optical fiber 96 in the array being aligned with one or more pixels and the opposite second end 100 of each optical fiber 96 in the array positioned in the sight line of the observer to transmit the first and/or second diffracted polarized images to the analyzer 16. Optical fibers having utility in the integrator 94 are commercially available from Poly-Optical Products, Inc., 17475 Gillette Ave., Irvine, Calif. 92614, USA.

The selected optical fibers can have cross sections in any number of geometrical configurations, such as round, square, rectangular, or hexagonal. A preferred cross section is rectangular, wherein the optical fiber 96 is sized to cover only two pixels of the display, which are in a vertical alignment as shown in FIG. 5. This configuration of the optical fiber 96 preserves the horizontal resolution of the display 14 by avoiding integration of light from horizontally adjacent pixels.

In accordance with an alternate embodiment not shown, the viewing panel of the display can utilize the integrator alone in the absence of the diffuser. An optical fiber array can perform the same function by itself as the diffuser and integrator in combination by extending the length of the optical fibers relative to optical fibers used in combination with the diffuser. A preferred cross section for the optical fiber of the present alternate embodiment is square. The length of the optical fiber is desirably greater than 20 times the width of the optical fiber cross section to achieve effective integration of the light from the front polarizer. By comparison, the length of the optical fiber can advantageously be less than 10 times the width of the optical fiber cross section to achieve effective integration of the light from the front polarizer when a diffuser is used in combination with the optical fiber array.

While the forgoing preferred embodiments of the invention have been described and shown, it is understood that alternatives and modifications, such as those suggested and others, may be made thereto and fall within the scope of the invention.

I claim:

1. A stereoscopic imaging assembly, comprising:
a display comprising:
first and second image pixels enabling transmission of a first image and a second image;
a heterogeneous front polarizer in front of the first and second image pixels receiving the first and second images, the heterogeneous front polarizer having a first polarization material and a second polarization material, the first polarization material enables transmission of the first image, and the second polarization material enables transmission of the second image; and
a rear polarizer positioned in the rear of the first and second image pixels;
an analyzer comprising:
a first and second analyzer unit enabling transmission of the first and second image from the display to a first and second eye of an observer, while essentially blocking transmission of the image for the other eye,
thereby enabling the first eye to receive the first polarized image and the second eye to receive the second polarized image, enabling the observer to synthesize the first and second polarized images into a stereoscopic visual image; and
an integrator positioned in front of the heterogeneous front polarizer;
whereby half-black imaging to the eye of the observer is substantially eliminated.

2. The stereoscopic imaging assembly of claim 1 wherein the rear polarizer is homogeneous, polarizing all light contacting the rear polarizer to light of a single polarity.

3. The stereoscopic imaging assembly of claim 1 wherein the rear polarizer is heterogeneous having a first polarization material and a second polarization material arranged in the polarization pattern of the front polarizer, the first polarization material enabling transmission of light of the first polarity therethrough, while essentially blocking transmission of light of the second polarity therethrough, and the second polarization material enabling transmission of light of the second polarity therethrough, while essentially blocking transmission of light of the first polarity therethrough.

4. The stereoscopic imaging assembly of claim 3 wherein the first polarization material of the rear polarizer is essentially identical to the first polarization material of the front polarizer.

5. The stereoscopic imaging assembly of claim 3 wherein the second polarization material of the rear polarizer is essentially identical to the second polarization material of the front polarizer.

6. The stereoscopic imaging assembly of claim 1 wherein the analyzer is eyewear configured to be worn over the first and second eyes of the observer, the first analyzer unit being a first eyepiece and the second analyzer unit being a second eyepiece.

7. The stereoscopic imaging assembly of claim 1 further comprising an image source for receiving a first true optical image and a second true optical image, converting the first true optical image to a first electronic image transmittable to the display, and converting the second true optical image to a second electronic image transmittable to the display.

8. The stereoscopic imaging assembly of claim 1 wherein the display further includes a backlight source and wherein the rear polarizer is positioned between the backlight source and the first and second image pixels.

9. The stereoscopic imaging assembly of claim 1 wherein the display is a liquid crystal display having a liquid crystal material, the first and second pixels being comprised of liquid crystal material.

10. The stereoscopic imaging assembly of claim 1 wherein the display further includes a front plate and wherein the heterogeneous front polarizer is positioned between the front plate and the first and second image pixels.

11. The stereoscopic imaging assembly of claim 1 wherein the heterogeneous front polarizer is sufficiently closely coupled with the first and second image pixels to substantially diminish parallax of the first and second polarized images.

12. The stereoscopic imaging assembly of claim 1 wherein the heterogeneous front polarizer has a thickness selected sufficiently thin to substantially diminish parallax of the first and second polarized images.

13. The stereoscopic imaging assembly of claim 1 wherein the heterogeneous front polarizer has a thickness of about 1 micron or less.

14. The stereoscopic imaging assembly of claim 1 further comprising a diffuser positioned in front of the heterogeneous front polarizer.

15. A stereoscopic imaging assembly comprising:
first and second image pixels enabling transmission of a first and second image therefrom, the first and second image pixels arranged in a pixel distribution pattern;
a heterogeneous front polarizer positioned generally in front of the first and second image pixels having a first and second polarization material,
the first and second polarization materials arranged in a polarization pattern correlated with the pixel distribution pattern,
the first polarization material enables transmission of light of a first polarity therethrough, while essentially blocking transmission of light of a second polarity therethrough, thereby transmitting a first polarized image having a first polarity and corresponding to the first image, and
the second polarization material enables transmission of light of the second polarity therethrough, while essentially blocking transmission of light of the first polarity therethrough, thereby transmitting a second polarized image having a second polarity and corresponding to the second image;
a rear polarizer positioned generally in the rear of the first and second image pixels; and
an integrator positioned in front of the heterogeneous front polarizer,
whereby half-black imaging to the eyes of the observer is substantially eliminated.

16. The stereoscopic imaging assembly of claim 15 wherein the rear polarizer is homogeneous, polarizing all light contacting the rear polarizer to light of a single polarity.

17. The display stereoscopic imaging assembly of claim 15 wherein the rear polarizer is heterogeneous having a first polarization material and a second polarization material arranged in the polarization pattern of the front polarizer, the first polarization material enabling light of the first polarity to pass through the rear polarizer, but not light of the second polarity, and the second polarization material enabling light of the second polarity to pass through the rear polarizer, but not light of the first polarity.

18. A stereoscopic imaging assembly comprising:
an image source capable of receiving a first optical image and a second optical image, and converting the first optical image to a first transmittable electronic image and the second optical image to a second transmittable electronic image;
a liquid crystal display receiving the first electronic image, and the second electronic image, and generating first and second image pixels arranged in a pixel distribution pattern in response to receiving the first and second electronic images comprising:
a heterogeneous front polarizer positioned generally in front of the first and second image pixels, the heterogeneous front polarizer having a first and second polarized material,
the first and second polarization materials arranged in a polarization pattern correlated with the pixel distribution pattern, the first polarization material capable of enabling transmission of light of a first polarity therethrough. while essentially blocking transmission of light of a second polarity therethrough. thereby transmitting a first polarized image having the first polarity and corresponding to the first image, and
the second polarization material capable of enabling transmission of light of the second polarity therethrough, while essentially blocking transmission of light of the first polarity therethrough, thereby transmitting a second polarized image having the second polarity and corresponding to the second image;
a rear polarizer positioned generally in the rear of the first and second image pixels; and
an analyzer comprising:
a first and second analyzer unit enabling transmission of the first and second polarized image from the display generally to a first and second eye of an observer, while essentially blocking transmission of the polarized image for the other eye,
thereby enabling the first eye to receive the first polarized image and the second eye to receive the second polarized image, and enabling the observer to synthesize the first and second polarized images into a stereoscopic visual image; and
an integrator positioned in front of the heterogeneous front polarizer;
whereby half-black imaging to the eyes of the observer is substantially eliminated.

19. The stereoscopic imaging assembly of claim 18 wherein the rear polarizer is homogeneous, polarizing all light contacting the rear polarizer to light of a single polarity.

20. The stereoscopic imaging assembly of claim 18 wherein the rear polarizer is heterogeneous having a first polarization material and a second polarization material arranged in the polarization pattern of the front polarizer, the first polarization material enabling transmission of light of the first polarity therethrough, while essentially blocking transmission of light of the second polarity therethrough, and the second polarization material enabling transmission of light of the second polarity therethrough, while essentially blocking transmission of light of the first polarity therethrough.

21. The stereoscopic imaging assembly of claim 18 wherein the analyzer is eyewear configured to be worn over the first and second eyes of the observer, the first analyzer unit being a first eyepiece and the second analyzer unit being a second eyepiece.

22. The stereoscopic imaging assembly of claim 18 wherein the display further includes a backlight source and wherein the rear polarizer is positioned between the aid backlight source and the first and second image pixels.

23. The stereoscopic imaging assembly of claim 18 wherein the display further includes a front plate and wherein the front polarizer is positioned between the front plate and the first and second image pixels.

24. The stereoscopic imaging assembly of claim 18 wherein the front polarizer is sufficiently closely coupled with the first and second image pixels to substantially diminish parallax of the first and second polarized images.

25. The stereoscopic imaging assembly of claim 18 wherein the front polarizer has a thickness selected sufficiently thin to substantially diminish parallax of the first and second polarized images.

26. The stereoscopic imaging assembly of claim 18 wherein the front polarizer has a thickness of about 1 micron or less.

27. The stereoscopic imaging assembly of claim 18 further comprising a diffuser positioned in front of the heterogeneous front polarizer.

28. The stereoscopic imaging assembly of claim 18, further comprising a diffuser positioned in front of the heterogeneous front polarizer.

29. A device, comprising:
first image pixels capable of enabling transmission of a first image therefrom;
second image pixels capable of enabling transmission of a second image therefrom;
a heterogeneous front polarizer positioned generally in front of first and second image pixels, comprising a first polarization material and a second polarization material, wherein first polarization material is capable of enabling transmission of said first image pixels at a first polarity therethrough, thereby transmitting a first polarized image having a first polarity and corresponding generally to first image, and said second polarization material capable of enabling transmission of second image pixels at a second polarity therethrough, and thereby transmitting a second polarized image at a second polarity and corresponding generally to said second image; and
an integrator, wherein front polarizer is positioned generally between integrator and said first and second image pixels.

30. The display of claim 29, further comprising a non-polarizing diffuser, wherein said front polarizer is positioned generally between said diffuser and first and second image pixels.

31. The display of claim 29, further comprising a rear polarizer generally positioned in the rear of said first and second image pixels.

32. The display of claim 31, wherein said rear polarizer is homogeneous and capable of polarizing light contacting said rear polarizer to light of a single polarity.

33. The display of claim 31, wherein said rear polarizer is heterogeneous and comprises a first polarization material and a second polarization material configured similarly to polarization pattern of said front polarizer, said first polarization material capable of enabling light of said first polarity to pass through said rear polarizer, but not light of said second polarity, and said second polarization material capable of enabling light of said second polarity to pass through said rear polarizer, but not light of said first polarity.

* * * * *